United States Patent
Guionneau et al.

(10) Patent No.: US 10,423,866 B2
(45) Date of Patent: Sep. 24, 2019

(54) METHOD FOR MANAGING THE DEVICES OF A DATA CENTRE

(71) Applicant: BULL SAS, Les Clayes-sous-Bois (FR)

(72) Inventors: Christophe Guionneau, Grenoble (FR); Matthieu Isoard, Teche (FR); Xavier Plattard, Eybens (FR)

(73) Assignee: BULL SAS, Les Clayes-sous-Bois (FR)

( * ) Notice: Subject to any disclaimer, the term of this patent is extended or adjusted under 35 U.S.C. 154(b) by 313 days.

(21) Appl. No.: 15/128,760

(22) PCT Filed: Mar. 20, 2015

(86) PCT No.: PCT/FR2015/050694
§ 371 (c)(1),
(2) Date: Sep. 23, 2016

(87) PCT Pub. No.: WO2015/145038
PCT Pub. Date: Oct. 1, 2015

(65) Prior Publication Data
US 2017/0103290 A1 Apr. 13, 2017

(30) Foreign Application Priority Data
Mar. 26, 2014 (FR) ..................................... 14 52589

(51) Int. Cl.
*G06K 17/00* (2006.01)
*G05D 1/02* (2006.01)
(Continued)

(52) U.S. Cl.
CPC ....... *G06K 17/0022* (2013.01); *G05D 1/0231* (2013.01); *G06K 7/10297* (2013.01);
(Continued)

(58) Field of Classification Search
CPC ........... G06K 17/0022; G06K 7/10297; G06K 7/1417; G05D 1/0231; G06Q 10/08;
(Continued)

(56) References Cited

U.S. PATENT DOCUMENTS 8,342,400 B1 * 1/2013 Reese ................. G06F 19/3462
235/385
8,584,942 B1 11/2013 Rayes et al.
(Continued)

FOREIGN PATENT DOCUMENTS

EP 2 161 219 A1 3/2010
GB 2 501 567 A 10/2013

OTHER PUBLICATIONS

International Search Report as issued in International Patent Application No. PCT/FR2015/050694, dated May 27, 2015.

*Primary Examiner* — Daniel I Walsh
(74) *Attorney, Agent, or Firm* — Pillsbury Winthrop Shaw Pittman LLP

(57) ABSTRACT

A method for managing a data center that includes racks arranged in aisles, includes guiding an operator, by a mobile terminal, to a desired device of a rack. The guiding step includes: indicating, on a screen of the mobile terminal, a route to follow to arrive near the device; once the operator is near the device, reading, by a reading application of the mobile terminal, an electronic marker pattern placed on a first rack facing the operator to determine if the operator is facing the rack including the desired device; if not, repeating the reading operation on the rack directly adjacent to the first rack; once the rack is identified, reading, by the reading application of the mobile terminal, an optical marker pattern placed on the rack so as to obtain a height reference and thus locate the desired device; and acting upon the desired device using the mobile terminal.

13 Claims, 2 Drawing Sheets

(51) Int. Cl.
- *G06Q 10/08* (2012.01)
- *G06Q 10/00* (2012.01)
- *G06K 7/10* (2006.01)
- *G06K 7/14* (2006.01)
- *G06T 19/00* (2011.01)

(52) U.S. Cl.
CPC ........... *G06K 7/1417* (2013.01); *G06Q 10/08* (2013.01); *G06Q 10/087* (2013.01); *G06Q 10/0833* (2013.01); *G06Q 10/20* (2013.01); *G06T 19/006* (2013.01)

(58) Field of Classification Search
CPC .. G06Q 10/087; G06Q 10/0833; G06Q 10/20; G06T 19/006
See application file for complete search history.

(56) References Cited

U.S. PATENT DOCUMENTS

| | | | | |
|---|---|---|---|---|
| 8,831,514 | B2* | 9/2014 | Tysowski | H04W 4/02 |
| | | | | 455/41.1 |
| 9,120,622 | B1* | 9/2015 | Elazary | B25J 19/023 |
| 9,602,976 | B1* | 3/2017 | Notohardjono | H04W 4/023 |
| 10,024,681 | B2* | 7/2018 | Taylor | G01C 21/206 |
| 2002/0109593 | A1* | 8/2002 | Swartzel | G06Q 10/087 |
| | | | | 340/540 |
| 2003/0033217 | A1* | 2/2003 | Cutlip | G06Q 10/087 |
| | | | | 705/26.1 |
| 2006/0085293 | A1* | 4/2006 | Melucci | G06F 16/2365 |
| | | | | 705/28 |
| 2006/0210115 | A1* | 9/2006 | Nemet | G05D 1/0234 |
| | | | | 382/104 |
| 2007/0124077 | A1* | 5/2007 | Hedlund, Jr. | G06Q 10/087 |
| | | | | 701/300 |
| 2008/0106377 | A1* | 5/2008 | Flores | G06Q 10/087 |
| | | | | 340/5.92 |
| 2008/0122615 | A1* | 5/2008 | Shoenfeld | G08B 13/14 |
| | | | | 340/540 |
| 2008/0272886 | A1* | 11/2008 | Tiller | G06K 19/08 |
| | | | | 340/10.1 |
| 2009/0044845 | A1* | 2/2009 | Cui | A61B 1/123 |
| | | | | 134/56 R |
| 2009/0138303 | A1* | 5/2009 | Seshadri | G06Q 10/087 |
| | | | | 705/1.1 |
| 2010/0029328 | A1* | 2/2010 | Kuo | H04M 1/22 |
| | | | | 455/556.1 |
| 2010/0121480 | A1* | 5/2010 | Stelzer | B65G 1/137 |
| | | | | 700/215 |
| 2010/0176922 | A1* | 7/2010 | Schwab | G06K 7/10356 |
| | | | | 340/10.1 |
| 2011/0052001 | A1* | 3/2011 | Tan | G06Q 10/08 |
| | | | | 382/103 |
| 2011/0055172 | A1* | 3/2011 | Tan | G06F 17/30241 |
| | | | | 707/692 |
| 2011/0082584 | A1* | 4/2011 | Meyrahn | A22C 15/001 |
| | | | | 700/253 |
| 2011/0153614 | A1* | 6/2011 | Solomon | B65G 1/127 |
| | | | | 707/740 |
| 2011/0241833 | A1* | 10/2011 | Martin | G08C 21/00 |
| | | | | 340/10.1 |
| 2012/0075071 | A1* | 3/2012 | Liu | B65D 19/001 |
| | | | | 340/10.1 |
| 2012/0191272 | A1* | 7/2012 | Andersen | G06Q 10/087 |
| | | | | 701/2 |
| 2013/0046884 | A1 | 2/2013 | Frost et al. | |
| 2013/0111495 | A1* | 5/2013 | Blanck | G06F 9/5083 |
| | | | | 718/105 |
| 2013/0118094 | A1* | 5/2013 | Laspia | E04H 1/00 |
| | | | | 52/79.1 |
| 2013/0147839 | A1* | 6/2013 | Fukushima | G06Q 30/06 |
| | | | | 345/633 |
| 2013/0277430 | A1* | 10/2013 | Zumsteg | G06K 7/10009 |
| | | | | 235/462.09 |
| 2015/0178673 | A1* | 6/2015 | Penneman | B65G 1/0492 |
| | | | | 104/18 |
| 2015/0206098 | A1* | 7/2015 | Muench | G06Q 10/0835 |
| | | | | 705/337 |
| 2016/0034730 | A1* | 2/2016 | Delplace | G06K 7/10366 |
| | | | | 340/8.1 |
| 2016/0176635 | A1* | 6/2016 | Varley | B65G 1/137 |
| | | | | 700/216 |
| 2016/0236867 | A1* | 8/2016 | Brazeau | B65G 1/1378 |
| 2017/0150539 | A1* | 5/2017 | Szeto | H04W 76/14 |
| 2017/0247108 | A1* | 8/2017 | Ljubuncic | B64C 39/024 |
| 2017/0270579 | A1* | 9/2017 | Ridao Carlini | G05D 1/0022 |
| 2018/0020145 | A1* | 1/2018 | Kotfis | H04N 5/2352 |
| 2018/0053232 | A1* | 2/2018 | Kauffman | G06Q 30/0623 |
| 2018/0057283 | A1* | 3/2018 | Peters | B25J 5/007 |

\* cited by examiner

METHOD FOR MANAGING THE DEVICES OF A DATA CENTRE

CROSS REFERENCE TO RELATED APPLCATIONS

This application is the U.S. National Stage of PCT/FR2015/050694, filed Mar. 20, 2015, which in turn claims priority to French Patent Application No. 1452589 filed on Mar. 26, 2014, the entire contents of all applications are incorporated herein by reference in their entireties.

TECHNICAL FIELD OF THE INVENTION

The invention relates to a method for managing the devices of a data centre. The field of invention is therefore, in general terms that of data centres.

Data centres and system hosting centres consist of buildings containing large rooms where bays of devices, commonly called racks, are assembled. Racks are cabinets which are generally metal, and which are intended to contain cases of devices, usually electronic devices (for example network equipment, computer servers, etc.). In the IT world racks are thus used to concentrate a substantial number of machines in a given floor area, whilst optimising the wiring of the said machines and the cooling system.

The very large floor areas of data centres are generally organised into rows and columns, the coordinates of which (rows, columns) enable the racks to be identified. Inside these racks the marking of the height positions enable the devices to be identified. The dimensions of the racks are standardised. In addition, to identify the height position of a device in a rack a "U" measurement is used, where each "U" represents a' height of 44.45 millimeters.

Data centres are currently managed using specialised applications, called DCIM (Data Centre Infrastructure Management) applications. These applications manage simultaneously the filling rates of the racks, energy management in the data centre, and/or environmental management, typically supervision of temperature or hygrometry. Some data centres fit to each element (rack, network device, storage, computation unit, etc.) wireless sensors which enable the position of the said element to be recorded. It is thus possible to obtain the environmental parameters closest to the element in question. These wireless sensors generally use RFID technology, or other technologies; they require at least one active antenna to be able to read remotely, and several antennae to accomplish triangulation and assess the position of the sensor.

DCIM applications then interface with a sensor manager to obtain real information relating to events in each room of the data centre. These same DCIM applications also cooperate with a database containing the description of all the devices present in the data centre. This database must be constantly updated.

STATE OF THE PRIOR ART

Conventionally, day-to-day management of a data centre implies physical interventions on the racks of devices by operators, essentially to:
  Add new devices
  Remove/replace unused devices
  Move devices to optimise energy management or network access
  Intervene on defective devices, for example to replace hard disks in a storage bay.

These interventions must be as short as possible to optimise hardware usage rates and the availability of the provided services. They must be precise, and must not affect the data centre's operation.

DCIM data centre management applications contain a database fed with updates of movements of devices in the data centre's racks.

During interventions the devices are located by the identifier of the rack: the column of the rack, the position of the rack in the column, and the "U"-numbered position of the device in the rack, i.e. its vertical positioning in the rack. The operator, who knows the location of the device in the data centre, must determine their own location in the data centre to find the device on which the intervention must be performed. When adding or moving a device the operator must do the location operations and propagate the modifications in the data centre's management application.

The existing data centre management solutions do not therefore enable:
  Fast and accurate location of a device in the data centre
  Easy guiding of the operator to the device
  Simple verification of the consistency of the devices' real characteristics with the data centre management application data.
  Dynamic (real-time) management of updates of the data centres' components.

DESCRIPTION OF THE INVENTION

The invention seeks to remedy all or a proportion of the disadvantages of the state of the art identified above and in particular to propose means for optimal management of a data centre. Management of the data centre refers to a least one of the following operations: guiding of an operator to a device, precise location of a device, recording of the devices in a database. In the invention it is proposed to implement a data centre management method making use of inexpensive, maintenance-free technologies, which can be deployed on a massive scale. The present invention thus also proposes a method for locating and viewing the position of the devices in a data centre, where the said method enables an operator to intervene on the devices using principles of augmented reality; the management method according to the invention also advantageously proposes operations to update and consolidate the recorded data, for example the precise position of a device, in a management application of the data centre.

To this end, provision is made, in various implementations of the method according to the invention, to equip the operators with a tool for precise guidance to the device which they wish to visit, for example to undertake an intervention, and a tool for precise identification of the component. Advantageously, the same tool available to the operators allows precise recording of added or modified devices, and recording of the precise position in the data centre of each device in question.

In the invention use is advantageously made of technologies which do not require maintenance, or additional wired connections, in a space which is already overloaded with connections. Indeed, it is not advantageous to use, on each device, active sensors using cells or batteries, even with a lifetime of three to five years, as it is too time-consuming to change thousands of batteries at the same time. The method according to the invention is based on simple technologies, which can be easily deployed in a data centre which is already established or being established.

The present invention thus relates essentially to a method for managing a data centre where the said data centre contains a plurality of racks arranged in a plurality of aisles, characterised in that the said method includes several steps consisting in:

Guiding an operator by means of a mobile terminal towards a sought device present in a rack of the plurality of racks; where the guiding step includes the various operations consisting in:

Indicating on a screen of the mobile terminal a path to be followed in the data centre to arrive close to the device, where the said mobile terminal is equipped with a geolocation system;

When the operator is close to the device, reading by means of a reading application of the mobile terminal an electronic marker pattern positioned on a first rack opposite the operator to determine whether the operator is facing the rack containing the sought device; if this is not the case, repeating the read operation to the rack directly adjoining the first rack;

When the rack containing the sought device has been identified, reading by means of the mobile terminal's reading application an optical pattern positioned on the said rack containing the sought device to obtain a height reference, and by this means to locate the sought device.

Intervening on the said sought device by means of the mobile terminal.

In the invention the electronic terminal is equipped with a geolocation system which enables it to be positioned with an accuracy of between approximately one meter and some fifty centimeters; the expression "close to the device" thus means that the terminal is within this distance range of the sought device. It is then possible that the operator may be unable to decide between two adjoining racks to search for the device; they then make use of the electronic marker patterns.

In addition to the main characteristics which have just been mentioned in the preceding paragraph, the method according to the invention may have one or more of the following possible additional characteristics, considered individually or in technically possible combinations:

The electronic marker pattern is of the NFC tag type, in particular of the self-adhesive type. In other example implementations of the invention provision may be made for other types of electronic tag allowing storage and contactless reading in close proximity.

The method according to the invention includes a preliminary step consisting in fitting a plurality of racks of the data centre with an electronic marker pattern.

Each electronic marker pattern is programmed with a unique identifier.

The optical pattern is of the type containing a QR-code.

The method according to the invention includes a preliminary step consisting in fitting a plurality of racks with optical patterns positioned at identical heights, where each rack includes at least one first optical pattern and one second optical pattern, separated by a previously determined height interval.

Each rack contains at least one optical pattern on its front face and at least one optical pattern on its rear face.

The optical pattern is used to calibrate an augmented reality module of the mobile terminal.

The mobile terminal is of the electronic tablet type.

The type of mobile terminal is that of glasses which display augmented reality information.

The step of intervention on the sought device includes an operation to read identification data recorded in the electronic marker pattern, and an operation to record the said identification data in a database.

The step of intervention on the sought device includes an operation to read information in the electronic marker pattern, where the said written information has been recorded in a database.

BRIEF DESCRIPTION OF THE FIGURES

Other characteristics and advantages of the invention will be seen clearly on reading the description below, with reference to the appended figures, which illustrate.

DETAILED DESCRIPTION OF ONE IMPLEMENTATION

The present invention relates to a method and principle for locating, identifying and intervening on elements of a IT data centre using a mobile terminal of the touch-sensitive tablet type.

Figure 1:
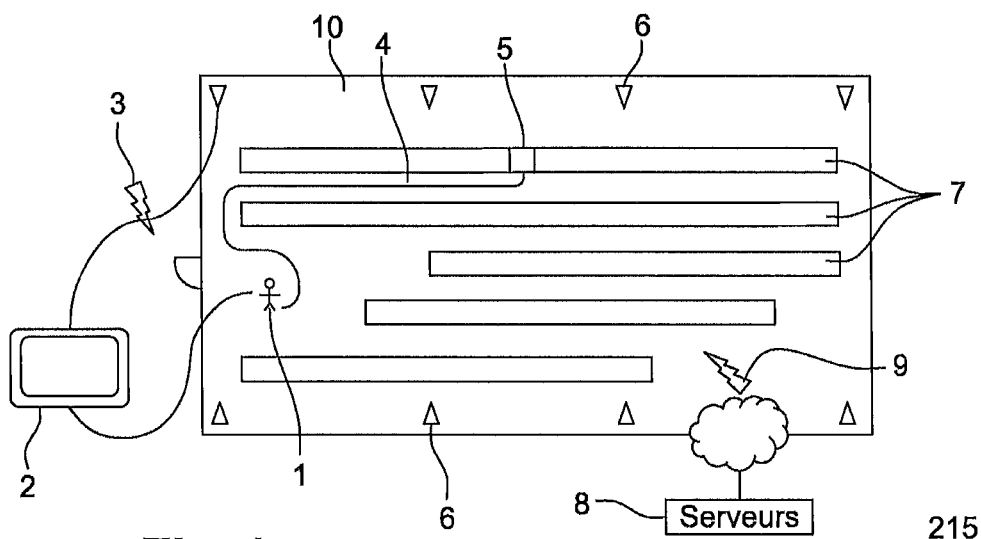
In FIG. 1, an overview of a data centre in which the method according to the invention is implemented.

As illustrated in FIG. 1, the aim of the method according to the invention is to enable an operator 1 equipped with a mobile terminal 2 to intervene in a room of the data centre type 10, and to be guided, step-by-step, along a path 4 by means of a location system in a data centre 10, through aisles 7, as far as a sought device 5 located in this data centre 10. When facing sought device 5, the method according to the invention allows precise location, particularly in terms of height, of sought device 5. Advantageously, the operator receives in their mobile terminal 2, and from a server 8, by electromagnetic waves 9 information relating to this device 5; advantageously, the operator then also has the possibility of updating the data of this device in a memory of server 8.

To attain these goals the method according to the invention combines the use of various technologies, including:

Mobile terminal 2, for example of the electronic tablet, phone tablet hybrid or smartphone type, or of the type of glasses known as "augmented reality" glasses, is advantageously fitted with an optical aiming system (for example a camera), a, system for writing/reading tags (NFC, or Bluetooth THE (Low Energy), etc.) and components prescribed by indoor geolocation technology.

an indoor geolocation technology which can be used by a mobile terminal with, in particular, the provision, in data centre 10, of transmitter/receiver terminals 6 able to communicate by radio link 3 with mobile terminal 2.

a technology known as an "augmented reality" technology, available in mobile terminal 2.—a database assembly embodied by server 8 to record a dataset relating to the management of the data centre The invention is not dependent on a particular implementation of each of these technologies.

Figure 2:
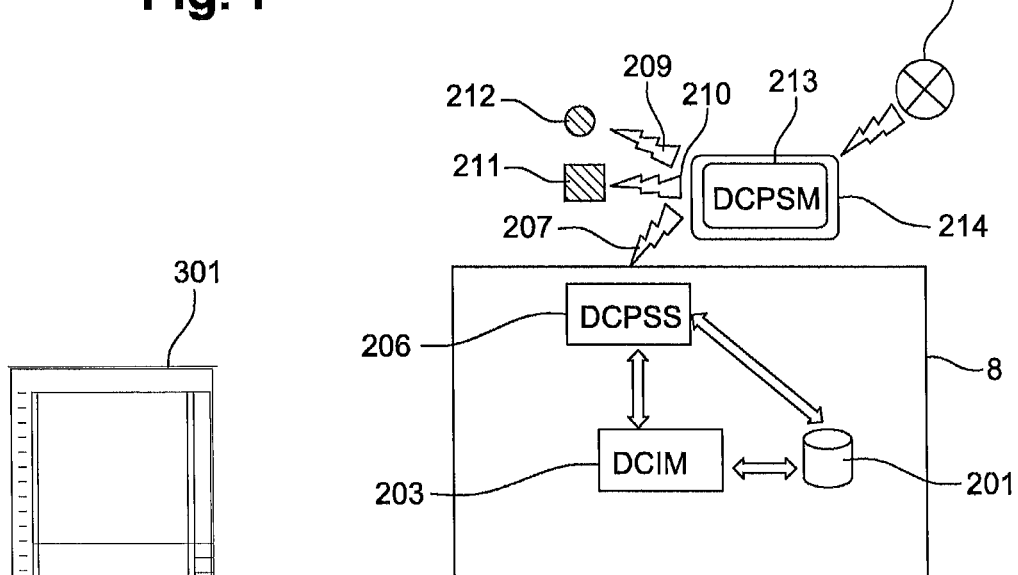
In FIG. 2, a diagrammatic representation of the various interactions occurring in an example implementation of the method according to the invention.

As illustrated in the example of FIG. 2, an example implementation of the invention involves an interaction of the following elements;

In server 8, a database/files 201 containing the data of the components comprising data centre 10 interacting with a DCPSS 206 application connector and/or towards an application 203 of the DCIM type for managing the data centre, where application 203 and application connector 206 also exchange data. —A set of programmable NFC labels 212 constituting electronic marker patterns.

A set of adhesive optical patterns 211 fitted to each rack of data centre 10

A device 214 for accomplishing positioning inside the buildings, able to achieve a resolution of the order of 50 cm, using in particular terminals 6 of FIG. 1.

A set of synchronisation mechanisms 207, 209, 210 and 215 exchanging data between mobile terminal 2 and the various elements which mentioned above.

These interactions are made possible through the presence of three separate but complementary systems: a geolocation system of the mobile terminal, a physical component localisation system, also referred to as a device, and a software system.

These devices are now described in greater detail for the description of a particular example of an implementation of the invention.

The geolocation device of the mobile terminal may be based on any technology allowing precise positioning, i.e. of the order of fifty centimeters inside a room constituting, in the present case, a room of the data centre.

The system for locating a device or a physical component consists, in the invention, of several elements which interact with the software system. The system for locating a device is installed before the software systems are used.

Figure 3:
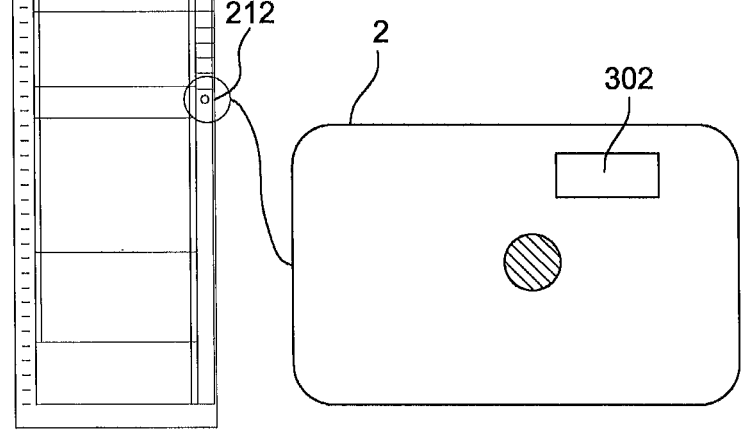
In FIG. 3, a diagrammatic representation of an example of use of an electronic marker pattern in the method according to the invention.

A first part of this location system is illustrated in FIG. 3. In this figure, an electronic marker pattern 212 capable of containing information has been represented. This type of marker pattern may be an NFC tag, for example a self-adhesive tag. Electronic marker pattern 212 is installed on each frame, or rack, 301. In one alternative of the invention, electronic marker pattern 212 can also be placed on all the components or devices of the frame. By reading and writing, by means of mobile terminal 2, a unique identifier (for example a series number), this tag allows dynamic management of updating of database 201 of the DCIM software application 203 for managing the elements of the data centre 10.

By using mobile terminal 2 equipped with application 302 for reading/writing the tag, operator 1 reads or writes this tag dynamically and checks/enters the information relating to the component equipped in this manner (rack or component/subcomponents of the rack).

Advantageously, the NFC 212 labels are placed on each rack 301 of data centre 10. In certain use cases they can also be placed on each element of a rack.

Each NFC 212 label is programmed with a unique identifier. In certain examples such data as the unique number identifying the manufacturer of the element (manufacturer ID) and the unique number identifying the element (product Number or Part Number) are added. These labels 212 are either preprogrammed by a device independent of the present invention, or by a specific application of mobile terminal 2.

The role of the electronic marker patterns is thus to enable all elements or racks of the data centre to be identified unambiguously, and/or to enable a new element in the database of the elements constituting the data centre to be recorded.

Figure 4:
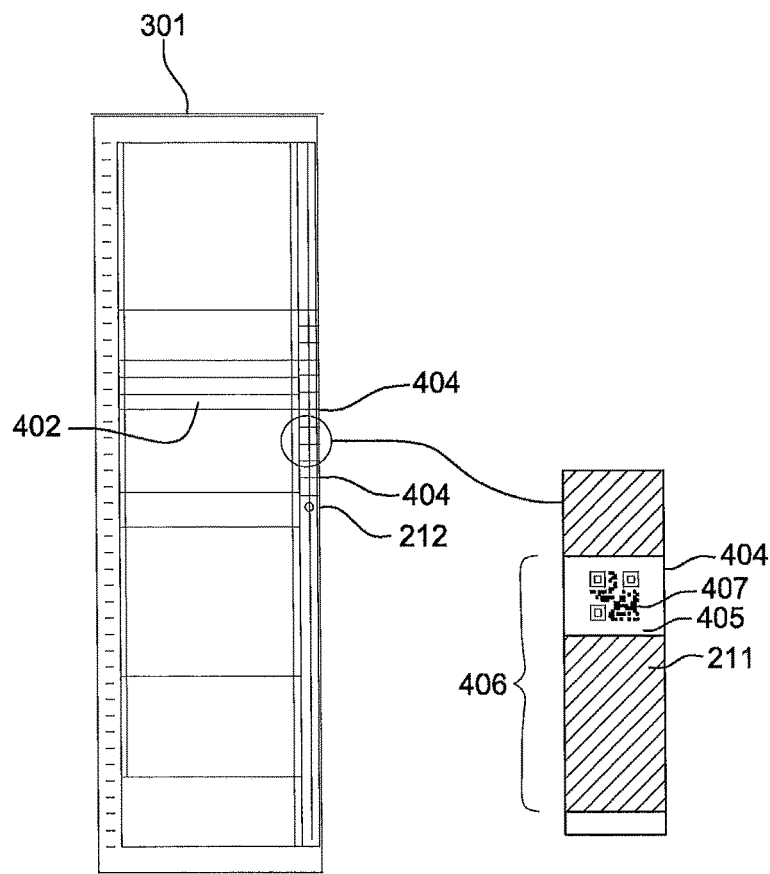
In FIG. 4, a diagrammatic representation of an example of use of an optical pattern in the method according to the invention.

A second part of the location system is illustrated in FIG. 4. It consists of an optical pattern 211. In each rack 301 with components or devices 402 there will be an optical pattern 211, which is thus added to electronic marker pattern 212 described in FIG. 3. Optical pattern 211 contains at regular intervals 406 (nU where $1<=n<$[maximum size of the rack in Us]) a system 404 enabling the height of component 402 in frame 301 to be known precisely.

This system 404 consists of a light-coloured element 405 one of the sides of which is positioned at a known height (opposite a 'U'). System 404 contains a unique identifier 407 advantageously encoded in an element of the QR-Code type enabling it to be identified uniquely.

Optical patterns 211 are advantageously self-adhesive. They enable an augmented reality module of an application of mobile terminal 2 to be calibrated. Each rack 301 of data centre 100 is advantageously fitted with two optical patterns 211: a first one on its front face and a second one on its rear face.

Optical patterns 211 are applied either on the right upright of the front face of racks 301, or on the left upright of the front face, and in the same way for the rear face.

The main functions of optical patterns 211 are to enable an application of mobile terminal 2 to determine the contours of rack 301 and to have a height reference in each rack 301 in question. Using this information the application is then able to locate all elements forming part of a rack from its altitude recorded in database 201 of the elements constituting the data centre.

To provide the interactions between the various elements used in the example implementations of the method according to the invention there is a software architecture, or software system.

This architecture consists essentially of a first application 213 (which can be seen in FIG. 2) known as the DCPSM, installed in mobile terminal 2, and of the software component, or application connector, 206 known as the DCPSS, equipping the server Application DCPSM 213 enables all the services described to be used by and displayed to the operator, and lets this operator perform all the operations involved in the invention.

Its roles are:

To enable the server software component to interface through the application connector To allow local storage (in mobile terminal 2) of the information required for it to operate if the connectivity in the data centre does not enable it to access the server software component. To enable the indoor geolocation components to interact such that the position of the mobile terminal in the data centre can be known at all times through a software component, in order to display the position, and also to enable interaction of a synchronisation component To enable the NFC labels to be read/written in order to introduce a new element into the data centre, or to update the information of an element To enable optical patterns, for example of the QR-Code type, to be targeted, recognised and interpreted, in order to be able to identify components and to use the locations of these components to add visual information relating to them by means of an Augmented Reality application.

To present an interface of the "Augmented Reality" type which enables the operator at once to be guided in the data centre, and to obtain information relating to a component or any other element of the data centre.

To receive messages informing them of a malfunction in the data centre, and to enable the operator to find the defective component and to take rapid action on this element.

The DCPSS 206 application consists of an application connector which can act as a gateway to the database of the elements constituting the data centre. As a preliminary step before implementing the method according to the invention, a set of geolocation data of the data centre elements is generated. This covers, firstly, the geographical positions of the racks in the indoor geolocation system's reference system and, secondly, the location data of the hardware elements in a rack. This data is stored:

if the database of the elements constituting the data centre is extensible, and if the software connector can access the database with sufficient rights, then the location data, obtained by synchronisation, is stored in the database of the elements constituting the data centre.

if the database is accessible via an extension of the DCIM application installed in the data centre, then the geolocation data is stored in the database of the elements constituting the data centre via the DCIM's interface.

in the other use cases a database specific to the application connector will contain the data in question.

The functions of the application connector are:

to establish a connection between the database of the elements constituting the data centre and the application for the mobile terminal, to enable the database of the elements constituting the data centre to be enriched with the data enabling the positioning of the elements to be determined, either by modifying the database of the elements constituting the data centre, or by using its own internal database.

to generate an extract of the data required to operate the application for the mobile terminal in "offline mode"

Figure 5:
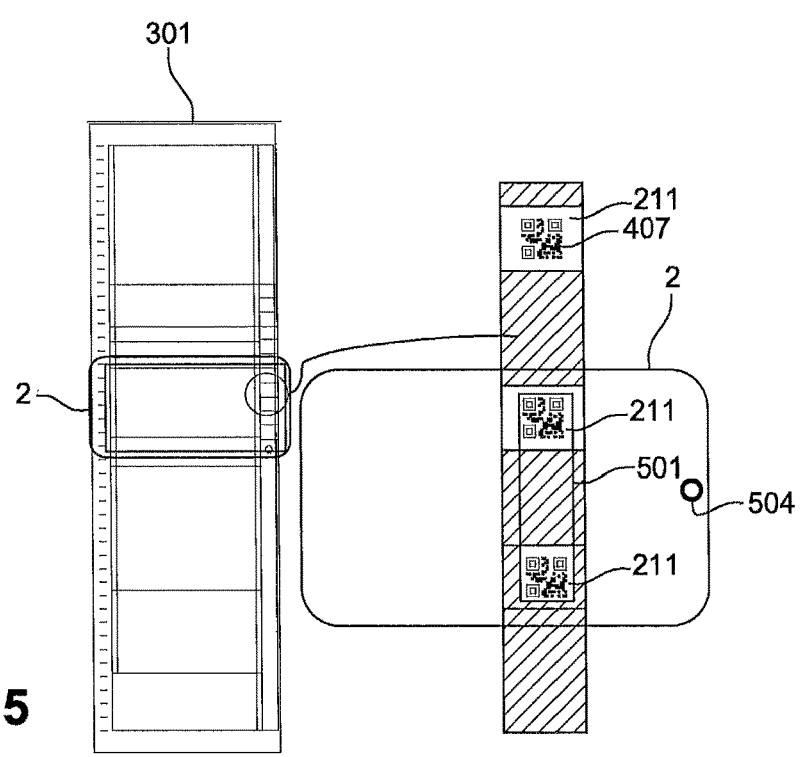
In FIG. 5, a diagrammatic representation of a step of aiming by means of a mobile terminal in an example implementation of the method according to the invention.

As explained above, in order to be able to identify a component of a rack accurately, and to determine its location in it, optical patterns 211 are installed in racks 301. When standing opposite rack 301 operator 1 puts their mobile terminal opposite rack 301 and aligns a software optical aiming system 501 with one or more optical patterns 211, as illustrated in FIG. 5.

The DCPSM application reads the content of patterns 211 located in the viewfinder and identifies the values represented by the various QR-Codes 407 read. Knowledge of the values of the QR-Codes 407 enables the targeted height and optical aiming angles to be determined. A strip 503 placed at a lateral end of rack 301 enables the edge of rack 301 to be located precisely, and the lateral position of operator 1 opposite rack 301 to be determined. The DCPSM application thus determines all the components in the field of vision of a camera 504 of mobile terminal 2.

Two examples of deployment of the method according to the invention are now described in detail, in two distinct scenarios:

Scenario 1: In the context of a data centre which is being created. The data centre is then empty and the location information is entered into the database by the mobile application as the data centre fills up.

Scenario 2: In the context of an existing data centre which already contains a number of elements.

Scenario 1: Deployment Process in the Context of a Data Centre which is being Created 1. The first step consists in installing the application connector to the database of the elements constituting the data centre, and checking that communication with the database is operational.

When this operation has been completed the operator executes the application on their mobile terminal and establishes a link to the installed database connector. They can then decide to use the application in online mode if it is possible to establish a network connection between the mobile terminal and the database connector in the data centre, or to use it in offline mode such a connection cannot be established (or for any other reason specific to it). If the operator decides to use offline mode the mobile application informs the database connector of this. This connector extracts the relevant location information from its data sources (external or internal database), and transfers this extract to the mobile application; this extract can be empty if the database does not contain the required information. If online mode is chosen the requests to the database connector are transmitted in real time by the mobile application, when they are required.

2. The second step consists in populating the data centre. This populating is undertaken under the operator's supervision. Each rack which joins the data centre is fitted with an NFC label and a pair of optical patterns (front face and rear face). From this point the process differs depending on whether the database of the elements constituting the data centre already contains the information relating to the elements which will populate the data centre (full database), or whether it is does not contain this information (empty database).

a. process for a full database: in the database each rack has a unique identifier, and all the elements installed in this rack are known and located by their "U" heights.

i. For each new rack positioned in the data centre the operator scans the NFC label glued on to the rack. If the NFC label has been preprogrammed it contains the unique identifier of the rack in the database. If the NFC label is blank the mobile application asks the user to choose the rack's unique identifier from the list of all the racks' identifiers to be installed in the data centre, and to save it (programme it) in the rack's NFC label.

ii. When this operation has been completed the application asks the operator to confirm the rack in question: the operator stands opposite the rack in question and then aims at the rack with their mobile terminal on which the mobile application is currently executing. The application uses the optical pattern to determine the geometry of the rack, and the indoor geolocation system to determine its position in the data centre.

iii. The rack's positioning information is then updated either in the local replica of the application (in offline mode), or directly through the database connector (in online mode).

1. If the vertical location information (in "U"s) in the rack is known, the graphical interface of the application uses its augmented reality system to highlight by superimposing each element in the rack. For each of these elements the application asks the operator to confirm its nature and its position in the rack.

2. Otherwise the application's graphical interface uses its augmented reality system to highlight each 1 "U" height position of the rack by superimposition The operator then uses the touch-sensitive interface of their mobile terminal to select the consecutive 1 "U" position or positions for an element which is to be recorded. And allocates to the selected locations the corresponding element from among the list of elements comprising the rack.

iv. Steps (ii, iii and iv) are repeated for the rear face of the rack.

v. Steps (i, ii, Hi, iv and v) are repeated for each rack which must be installed in the data centre.

vi. From this point all the hardware has been confirmed. If the application is being executed in offline mode the operator must re-establish a network connection between the application and the database connector.

vii. The application then asks that the gathered information is definitively consolidated in the database of the elements constituting the data centre, or in the connector's internal database. This consolidation is accomplished either by global approval (mass processing), or by individual approvals for each component of the data centre.

b. Process for an empty database: the operator will enter all the information required to feed the database with the elements constituting the data centre, with the assistance of the mobile application.

i. For each new rack positioned in the data centre the operator scans the NFC label glued on to the rack.

ii. The application allocates a unique identifier to the rack, and programs it in the rack's NFC label.

iii. When this operation has been completed the application asks the operator to save the rack in question: the operator stands opposite the rack in question and then aims at the rack with their mobile terminal on which the mobile application is currently executing. The application uses the optical pattern to determine the geometry of the rack, and the indoor geolocation system to determine its position in the data centre.

iv. The rack's positioning information is then updated either in the local replica of the application (in offline mode), or directly through the database connector (in online mode).

v. The application's graphical interface then uses its augmented reality system to highlight each 1 "U" height position of the rack by superimposition vi. The operator then uses the touch-sensitive interface of their mobile terminal to select the consecutive 1 "U" position or positions for an element which is to be recorded.

1. If the element in question has been pre-equipped with an NFC label (programmed by a third-party system), this label must contain the descriptive information of this element, i.e. the "Manufacturer ID" and the "product number" or "part number". The operator can then choose to scan this label, the mobile application stores the information contained in the label, and the application generates a unique identifier and programs it in the NFC label.

2. If the element does not have an NFC label the operator may, as they see fit, select a description of the elements from a list of known components, or enter a free description of this element (this information may be updated at a later date in the database of the elements constituting the data centre).

vii. Step (vi) is repeated for each component of the rack viii. Steps (iii, iv, v, vi and vii) are repeated for the rear face of the rack.

ix. Steps (i to viii) are repeated for each rack which must be installed in the data centre.

x. From this point all the hardware has been confirmed. If the application is being executed in offline mode the operator must re-establish a network connection between the application and the database connector, xi. The application then asks that the gathered information is definitively consolidated in the database of the elements constituting the data centre, or in the connector's internal database. This consolidation is accomplished either by global approval (mass processing), or by individual approvals for each component of the data centre.

Scenario 2—Deployment Process in the Context of an Existing Data Centre:

1. The first step consists in installing the application connector to the database of the elements constituting the data centre, and checking that communication with the database is operational. When this operation has been completed the operator executes the application on their mobile terminal and establishes a link to the installed database connector. They can then decide to use the application in online mode if it is possible to establish a network connection between the mobile terminal and the database connector in the data centre, or to use it in offline mode such a connection cannot be established (or for any other reason specific to it). If the operator decides to use offline mode the mobile application informs the database connector of this. This connector extracts the relevant location information from its data sources (external or internal database), and transfers this extract to the mobile application; this extract can be empty if the database does not contain the required information. If online mode is chosen the requests to the database connector are transmitted in real time by the mobile application, when they are required.

2. The second step consists in preparing the data centre for the system. Each rack forming part of the data centre is fitted with an NFC label and a pair of optical patterns (front face and rear face). From this point the process differs depending on whether the database of the elements constituting the data centre already contains the location and identification information relating to the elements which populate the data centre (full database), or whether it is does not contain this information (empty database).

a. process for a full database: each rack has a unique identifier in the database, its position in the data centre is either known or unknown, and all the elements installed in this rack are known.

i. The operator scans the NFC label attached to a rack, and chooses from the list of known racks the information for the current rack.

ii. the operator stands opposite the rack and aims at the rack with the optical device of their mobile terminal on which the mobile application is currently executing. The application uses the optical pattern to determine the geometry of the rack, and the indoor geolocation system to determine its position in the data centre.

iii. The rack's positioning information is then updated either in the local replica of the application (in offline mode), or directly through the database connector (in online mode).

iv. If the vertical positioning information (in "U"s) of the elements constituting the rack is present in the database the application uses its augmented reality module to highlight b. Process for an empty database: the operator will enter all the information required to feed the database with the elements constituting the data centre, with the assistance of the mobile application.

i. For each rack positioned in the data centre the operator must scan the NFC label glued on to the rack, ii. The application allocates a unique identifier to the rack, and programs it (i.e. writes it) in the rack's NFC label.

iii. When this operation has been completed the application asks the operator to save the rack in question: the operator stands opposite the rack in question and then aims at the rack with their mobile terminal on which the mobile application is currently executing. The application uses the optical pattern to determine the geometry of the rack, and the indoor geolocation system to determine its position in the data centre.

iv. The rack's positioning information is then created either in the local replica of the application (in offline mode), or directly through the database connector (in online mode).

v. The application's graphical interface then uses its augmented reality system to highlight each 1 "U" height position of the rack by superimposition vi. The operator then uses the touch-sensitive interface of their mobile terminal to select the consecutive 1 "U" position or positions for an element which is to be recorded.

1. If the element in question has been pre-equipped with an NFC label (programmed by a third-party system), this label must contain the descriptive information of this element, i.e. the "Manufacturer ID" and the "product number" or "part number". The operator can then choose to scan this label, the mobile application stores the information contained in the label, and the application generates a unique identifier and programs it in the NFC label.

2. If the element does not have an NFC label the operator may, as they see fit, select a description of the elements from a list of known components, or enter a free description of this element (this information may be updated at a later date in the database of the elements constituting the data centre).

vii. Step (vi) is repeated for each component of the rack viii. Steps (iii, iv, v, vi and vii) are repeated for the rear face of the rack.

ix. Steps (i to viii) are repeated for each rack which must be installed in the data centre.

x. From this point all the hardware has been confirmed. If the application is being executed in offline mode the operator must re-establish a network connection between the application and the database connector. The application then asks that the gathered information is definitively consolidated in the database of the elements constituting the data centre, or in the connector's internal database.

This consolidation is accomplished either by global approval (mass processing), or by individual approvals for each component of the data centre.

The invention claimed is:

1. A method for managing a data centre, the data centre containing
a plurality of racks arranged in a plurality of aisles, the method comprising:
guiding an operator using a mobile terminal towards a sought device in a target rack of the plurality of racks, the sought device being located at a stored height in the target rack, wherein the guiding step includes:
accessing a geolocation system of the mobile terminal to obtain geolocation data for indicating on a screen of the mobile terminal a path to be followed in the data centre to arrive close to the sought device previously entered into the mobile terminal;
reading, when the operator is close to the device, by a reading application of the mobile terminal, an electronic data tag positioned on a first rack opposite the operator to determine whether the operator is facing the target rack containing the sought device;
repeating, in response to a determination the first rack is not the target rack containing the sought device, the read operation on an electronic data tag of at least one rack directly adjoining the first rack;
reading, in response to identifying the first rack or one of the racks directly adjoining the first rack as the target rack based on the respective electronic data tags, by the reading application of the mobile terminal, an optical pattern positioned on the target rack containing the sought device to obtain a height reference of the sought device;
locating the sought device at its stored height within the target rack based on the height reference; and
performing a specified management operation on the sought device being located at the stored height.

2. The method according to claim 1, wherein the electronic data tags are NFC type electronic data tags.

3. The method according to claim 1, further comprising a preliminary step of fitting a plurality of racks of the data centre with respective electronic data tags.

4. The method according to claim 1, wherein each electronic electronic data tag is programmed with a unique identifier.

5. The method according to claim 1, wherein the optical pattern includes at least one QR type optical code.

6. The method according to claim 1, further comprising a preliminary step of fitting a plurality of racks with respective optical patterns, each of the optical patterns having a starting position at identical heights on the plurality of racks, wherein each rack includes at least one first optical code at the identical height and one second optical code, separated by a previously determined height interval for the respective rack in the respective optical pattern.

7. The method according to claim 1, wherein each rack contains at least one optical pattern on its front face and at least one optical pattern on its rear face.

8. The method according to claim 1, wherein the optical pattern is used to calibrate an augmented reality module of the mobile terminal.

9. The method according to claim 1, wherein the mobile terminal is of the electronic tablet type.

10. The method according to claim 1, wherein the mobile terminal is glasses which display augmented reality information.

11. The method according to claim 1, wherein the step of performing a specified management operation on the sought device includes reading identification data recorded in the electronic data tag, and recording the identification data in a database.

12. The method according to claim 1, wherein, the step of performing a specified management operation on the sought device includes reading information in the electronic data tag, wherein the read information has been recorded in a database.

13. The method according to claim 2, wherein the electronic data tag is of the self-adhesive type.

\* \* \* \* \*